United States Patent [19]

Clarkson

[11] Patent Number: 4,851,847
[45] Date of Patent: Jul. 25, 1989

[54] METHOD FOR ELIMINATING SELF-SCREENING NOISE JAMMING IN RADAR SYSTEMS

[75] Inventor: Charles B. Clarkson, Syracuse, N.Y.

[73] Assignee: The United States of America as represented by the Secretary of the Air Force, Washington, D.C.

[21] Appl. No.: 12,517

[22] Filed: Jan. 22, 1970

[51] Int. Cl.⁴ ................................................ G01S 7/36
[52] U.S. Cl. ..................................................... 342/17
[58] Field of Search .................. 343/18 E; 342/16, 17

[56] References Cited

U.S. PATENT DOCUMENTS 4,628,320 12/1986 Downie ............................. 342/17 X Primary Examiner—T. H. Tubbesing
Attorney, Agent, or Firm—William Stepanishen; Donald J. Singer

[57] ABSTRACT

A method for eliminating self-screening noise jamming from the main beam of a radar in order to reveal the skin echoes of aircraft at the same angle, including the aircraft carrying the jammer by using a main antenna and an auxiliary antenna located a short distance apart, delaying the signal from the auxiliary antenna, decorrelating the signals and cancelling the jamming signals.

1 Claim, 1 Drawing Sheet

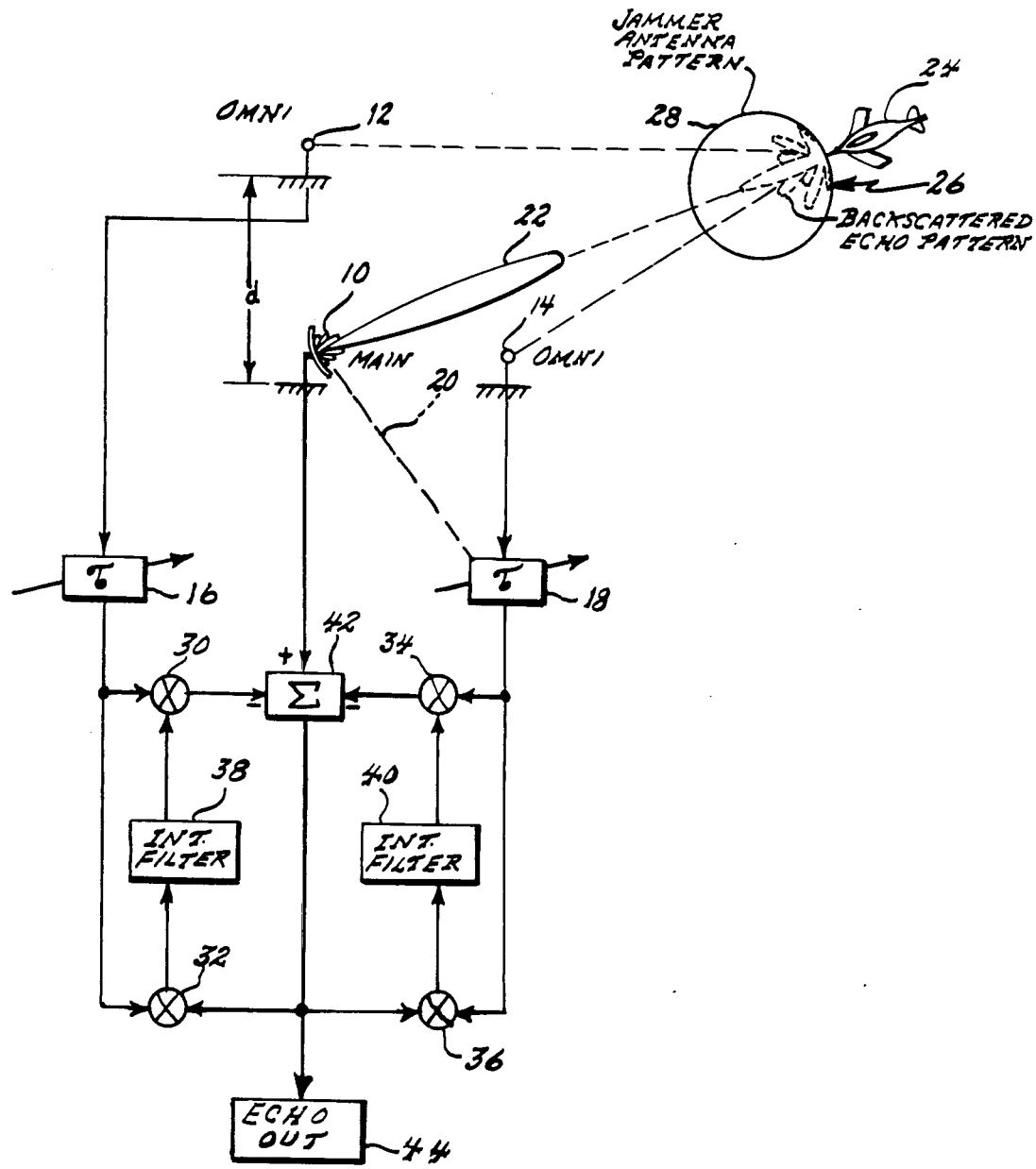

METHOD FOR ELIMINATING SELF-SCREENING NOISE JAMMING IN RADAR SYSTEMS

BACKGROUND OF THE INVENTION

This invention relates generally to radar jamming and more particularly to a method of operating a radar system which will function effectively in the presence of jamming signals.

An enemy aircraft radiating high power density noise jamming across the entire operating frequency band of a search or tracking radar represents a most formidable electronic countermeasures threat, and virtually no radars exist which can track the skin echo from small aircraft under these conditions. However, two jamming elimination methods have been investigated which are each capable of 20 db or more reduction in the jamming power: monopulse cancellation and polarization cancellation.

The former uses an appropriately amplified and phase shifted jamming signal from a monopulse Δ-beam to cancel the same jamming waveform from the Σ-beam, thus revealing the skin return. The latter method is similar, but uses, for example, the jamming waveform from a horizontally polarized feed to cancel the jamming from the vertically polarized feed.

Both methods use a "correlation and cancellation" feedback loop to derive and effect the required amplitude and phase adjustment necessary for cancellation. However, the significant item upon which a successful cancellation method depends is that the main and auxiliary channel signals must have a different vector combination of the jamming waveform and the target echo when it occurs. For purposes of illustration, if the main and auxiliary channel signals are $s(t)+j(t)$ and $\alpha[s(t)+\beta j(t)]$ respectively, where a and B are arbitrary complex constants; then a successful cancellation method i.e., jamming cancelled, signal not cancelled, can result as long as $\beta \neq 1$.

In the case of polarization cancellation, the required difference arises from a difference in the polarization of the target echo and the incident jamming.

SUMMARY OF THE INVENTION

A method is provided wherein the jamming cancellation sought is derived from combining widely spaced aperture samples of the vector sum of target echo and jamming. The system requires an auxiliary antenna and receiver located a small distance from the main radar antenna.

If the auxiliary omni channel gain is equal to the main antenna gain at the tip of the mainlobe, then the jamming waveform intercepted by the two antennas will differ by only two factors:

(a) A time delay due to the difference in echo path length, and (b) An amplitude difference due to the radiation pattern of the jamming antenna.

A negligibly small change is represented by (b) since jammer antenna patterns are generally very broad and $\epsilon$ is small (a fraction of 1°); therefore, if the auxiliary channel signal is delayed appropriately, it is virtually identical to the jamming waveform received in the main antenna, and thus conceptually ideal jamming cancellation can be obtained. The required delay compensation is known a priori, being dependent almost entirely on the look angle of the radar with respect to the auxiliary antenna location.

The target is illuminated by the main radar antenna, and reflects an echo in virtually all directions. The echo in any arbitrary direction consists of the complex sum of echoes from each individual scattering point on the target, each of which scatters a nearly omni-directional signal with a phase and amplitude depending on its physical location and its scattering coefficient.

The echo pattern from a complicated target, such as an aircraft, can be likened to the radiation pattern of a randomly excited, randomly positioned array antenna system.

It has been determined how large an angular separation is required between main and auxiliary antennas so that they intercept echoes *widely differing* in amplitude or phase after the time delay compensation, so that $\beta \neq 1$ and target is not cancelled.

Results show that complete decorrelation between the echoes requires an angular separation of $0.275 \lambda/R_o$; where $\lambda$ is the radiated wavelength, and $R_o$ is a measure of the gross physical size of the target. Thus, at X-band, a reasonable aircraft size is 100 to 500 $\lambda$, and the resulting angular separation is 0.5 to 2 milliradians.

For these parameters, an auxiliary antenna 300 ft. distant from the main antenna would allow successful sub-jamming visibility out to a range to the jammer of about 100 N.mi. This is a substantial improvement over a comparable self-screening range of 5-10 N.mi. without jamming cancellation.

It is therefore an object of this invention to provide a new and improved radar system which operates effectively in the presence of jamming signals.

It is another object of this invention to provide a new and improved multiple antenna radar system.

It is a further object of this invention to provide a new and improved method for eliminating self-screening noise jamming from the main beam of a radar system.

It is still another object of the invention to provide a new and improved method for revealing the skin echoes of aircraft in the presence of jamming.

These and other advantages, features and objects of the invention will become more apparent from the following description taken in connection with the illustrative embodiment in the accompanying drawing.

DESCRIPTION OF DRAWING

The FIGURE is a block diagram of a radar system utilizing a two loop echo decorrelation canceller.

DESCRIPTION OF PREFERRED EMBODIMENT

The FIGURE shows a block diagram of a radar system employing a two-loop echo decorrelation canceller. The system is particularly effective when employed with the method of the invention for countering self-screening jammers.

The system consists of a main radar antenna 10 and a first and second auxiliary omni antennas 12 and 14 respectively. The auxiliary antennas are located a distance "d" away from the main antenna. Each of the auxiliary antennas has a delay 16 and 18 to cause the signal to be virtually identical to the jamming waveform received at the main antenna. The delay compensation generally required for this is on the order of 0.1 to 0.25 of the radar pulse width.

The time delay compensation is slaved into the main beam pointing direction system indicated by the dashed line 20. This is because the delay must be switched in synchronism with the main beam scanning rate so that the jamming waveforms in the auxiliary channels have virtually identical epochs with the main channel waveform.

A pulse 22 from the main antenna approaches the aircraft 24 where it backscatters and produces an echo in the pattern generally shown as 26. In addition, the aircraft carries its own jamming equipment radiating a barrage-noise jamming pattern 28. The two signals are received by the antennas 10, 12 and 14 and are decorrelated in a correlation and cancellation operating in the form described hereinbefore.

The signals from the main antenna consist of the complex sum of the echoes from each scattering point on the target. These signals are combined with the delayed signals from the auxiliary antennas which have been appropriately mixed at points 30, 32, 34 and 36 and filtered at 38 and 40 to provide the point of cancellation 42 with a "clean" echo which is used as output at 44.

The system disclosed is one means by which the method of the invention may be accomplished, other appropriate systems may be adapted to utilize the invention with substantial success.

I claim:

1. A method for eliminating self-screening noise from main beam radar echo returns in a radar system comprising the steps of deploying a first main radar antenna; deploying a second and third auxiliary radar antenna a known distance from the first antenna; delaying the signals which are received respectively by said second and third antennas until it is identical to noise signals received by the first antenna; mixing and filtering said delayed signals; combining the signals from the first antenna with the altered signals from said second and third antennas, thereby cancelling the noise signals and providing an output means for the refined main antenna signal.

* * * * *